United States Patent
Boland et al.

(10) Patent No.: US 8,095,927 B2
(45) Date of Patent: Jan. 10, 2012

(54) OBJECT ORIENTED COMPONENT AND FRAMEWORK ARCHITECTURE FOR SIGNAL PROCESSING

(75) Inventors: Robert P. Boland, Wilmington, MA (US); Peter Simonson, Greenville, NH (US); Jeffrey F. Bryant, Londonderry, NH (US); Douglas K. Dalrymple, Nashua, NH (US); David R Wardwell, Bedford, NH (US)

(73) Assignee: Wisterium Development LLC, Wilmington, DE (US)

( * ) Notice: Subject to any disclaimer, the term of this patent is extended or adjusted under 35 U.S.C. 154(b) by 273 days.

(21) Appl. No.: 12/386,136

(22) Filed: Apr. 14, 2009

(65) Prior Publication Data

US 2010/0199274 A1    Aug. 5, 2010

Related U.S. Application Data

(60) Division of application No. 11/063,951, filed on Feb. 23, 2005, now Pat. No. 7,559,056, which is a continuation of application No. 10/233,338, filed on Aug. 30, 2002, now abandoned.

(51) Int. Cl.
    G06F 9/445    (2006.01)

(52) U.S. Cl. ...................................... 717/178
(58) Field of Classification Search .................. 717/100, 717/104, 175–178; 709/220–223, 230, 227; 719/315, 319, 515; 715/716; 370/401
See application file for complete search history.

(56) References Cited

U.S. PATENT DOCUMENTS

| | | | |
|---|---|---|---|
| 4,943,932 A | 7/1990 | Lark et al. |
| 5,590,156 A | 12/1996 | Carney |
| 5,608,722 A | 3/1997 | Miller |
| 5,752,032 A | 5/1998 | Keller |
| 5,802,355 A | 9/1998 | Arroyo et al. |
| 5,828,858 A | 10/1998 | Athanas et al. |
| 5,872,463 A | 2/1999 | Pedersen |
| 5,874,834 A | 2/1999 | New |
| 5,907,697 A | 5/1999 | Barbier et al. |
| 5,913,038 A | 6/1999 | Griffiths |
| 5,946,309 A | 8/1999 | Westberg et al. |
| 5,991,836 A | 11/1999 | Renda |

(Continued)

FOREIGN PATENT DOCUMENTS

EP    1187042    3/2002

(Continued)

OTHER PUBLICATIONS

PCT International Search Report dated Feb. 23, 2004 of International Application No. PCT/US2003/027093 filed Aug. 28, 2003.

(Continued)

*Primary Examiner* — Tuan Anh Vu
(74) *Attorney, Agent, or Firm* — Brundidge & Stanger, P.C.

(57) ABSTRACT

A signal intelligence system comprising a plurality of software components that are programmable to provide a signal intelligence function. The signal intelligence system includes a processor system having a plurality of interconnected processor devices and a plurality of processor managers that are connected to the processor devices and are configured to control software components associated with the processor devices. Further, the signal intelligence system has a framework manager that is configured to interact with the plurality of processor managers to control the processor devices and effectuate the signal intelligence function.

22 Claims, 8 Drawing Sheets

U.S. PATENT DOCUMENTS

| | | | |
|---|---|---|---|
| 6,047,115 | A | 4/2000 | Mohan et al. |
| 6,058,263 | A | 5/2000 | Voth |
| 6,128,276 | A | 10/2000 | Agee |
| 6,182,258 | B1 | 1/2001 | Hollander |
| 6,195,791 | B1 | 2/2001 | Carlson et al. |
| 6,199,195 | B1 | 3/2001 | Goodwin et al. |
| 6,204,687 | B1 | 3/2001 | Schultz et al. |
| 6,215,898 | B1 | 4/2001 | Woodfill et al. |
| 6,216,191 | B1 | 4/2001 | Britton et al. |
| 6,226,783 | B1 | 5/2001 | Limondin et al. |
| 6,230,307 | B1 | 5/2001 | Davis et al. |
| 6,233,610 | B1 | 5/2001 | Hayball et al. |
| 6,260,062 | B1* | 7/2001 | Davis et al. .......... 709/223 |
| 6,262,995 | B1 | 7/2001 | Kwak |
| 6,278,289 | B1 | 8/2001 | Guccione et al. |
| 6,308,311 | B1 | 10/2001 | Carmichael et al. |
| 6,308,314 | B1 | 10/2001 | Carlson et al. |
| 6,311,321 | B1 | 10/2001 | Agnihotri et al. |
| 6,326,806 | B1 | 12/2001 | Fallside |
| 6,347,387 | B1 | 2/2002 | Fischer |
| 6,347,395 | B1 | 2/2002 | Payne et al. |
| 6,351,143 | B1 | 2/2002 | Guccione et al. |
| 6,351,778 | B1 | 2/2002 | Orton et al. |
| 6,353,915 | B1 | 3/2002 | Deal et al. |
| 6,356,637 | B1 | 3/2002 | Garnett |
| 6,363,411 | B1 | 3/2002 | Dugan et al. |
| 6,370,682 | B1 | 4/2002 | Eckhardt et al. |
| 6,377,912 | B1 | 4/2002 | Sample et al. |
| 6,418,494 | B1 | 7/2002 | Shatas et al. |
| 6,421,692 | B1 | 7/2002 | Milne et al. |
| 6,424,991 | B1 | 7/2002 | Gish |
| 6,560,606 | B1 | 5/2003 | Young |
| 6,691,301 | B2 | 2/2004 | Bowen |
| 6,704,805 | B1* | 3/2004 | Acker et al. .......... 719/315 |
| 6,845,508 | B2 | 1/2005 | Parry |
| 6,948,174 | B2* | 9/2005 | Chiang et al. .......... 719/319 |
| 7,017,140 | B2 | 3/2006 | Haji-Aghajani et al. |
| 7,043,723 | B2 | 5/2006 | Briggs |
| 7,085,683 | B2 | 8/2006 | Anderson et al. |
| 7,367,020 | B2 | 4/2008 | Bickle et al. |
| 7,464,360 | B2 | 12/2008 | Haji-Aghajani et al. |
| 2002/0008540 | A1 | 1/2002 | Britton et al. |
| 2002/0014897 | A1 | 2/2002 | Ting |
| 2002/0031214 | A1 | 3/2002 | Cowan |
| 2002/0065958 | A1 | 5/2002 | Rocray et al. |
| 2002/0087947 | A1 | 7/2002 | Kwon et al. |
| 2002/0165961 | A1 | 11/2002 | Everdell et al. |
| 2002/0184348 | A1 | 12/2002 | Rapp et al. |
| 2003/0037174 | A1 | 2/2003 | Lavin et al. |
| 2003/0071854 | A1 | 4/2003 | Arrouye et al. |
| 2003/0084423 | A1 | 5/2003 | Clegg et al. |
| 2003/0110312 | A1 | 6/2003 | Gunduc et al. |
| 2003/0114163 | A1 | 6/2003 | Bickle et al. |
| 2003/0126195 | A1 | 7/2003 | Reynolds et al. |
| 2003/0131343 | A1 | 7/2003 | French et al. |
| 2003/0144983 | A1 | 7/2003 | Bigus et al. |
| 2003/0208641 | A1 | 11/2003 | Wesemann |
| 2004/0049609 | A1 | 3/2004 | Simonson et al. |
| 2004/0107277 | A1* | 6/2004 | Levesque et al. .......... 709/223 |
| 2005/0080905 | A1* | 4/2005 | Dolinar et al. .......... 709/227 |
| 2006/0248208 | A1* | 11/2006 | Walbeck et al. .......... 709/230 |

FOREIGN PATENT DOCUMENTS

| | | |
|---|---|---|
| WO | 01/45258 | 6/2001 |
| WO | 02/05444 | 1/2002 |
| WO | 02/056481 | 7/2002 |
| WO | 2004/021136 | 3/2004 |
| WO | 2004/021750 | 3/2004 |
| WO | 2004/100013 | 11/2004 |

OTHER PUBLICATIONS

PCT International Search Report dated Mar. 12, 2004 of International Application No. PCT/US2003/027476 filed Sep. 2, 2003.

Yang, Andrew et al., Developing Integrated Web and Database Applications Using JAVA Applets and JDBC Drivers, Technical Symposium on Computer Science Education, 1998, pp. 302-306.

Bruce, Alistair, et al., Re-useable Hardware/Software Co-verification of IP Blocks, ASIC/SOC Conference, 2001, Proceedings: 14th Annual IEEE International Conference, pp. 413-417.

Modelware, Product Brief Adaptation AAL1 Core Version 1.0 (2 pgs.).

Oakley, Bruce et al., Highly Configurable Network Interface Solutions on a Standard Platform, DesignCon 2002 Leading Edge Communication Design Conference (12 pgs).

Tommiska, Matti et al., An FPGA-based Implementation and Simulation of the AAL Type 2 Receiver, KCIS 129-2370/99, 1999 (5 pgs.).

Sztipanovits, Janos et al., Self-Adaptive Software for Signal Processing, Communications of the ACM, May 1998, vol. 41, No. 5, pp. 66-73.

Ledeczi, Akos et al., Synthesis of Self-Adaptive Software, In the Proceedings of the IEEE Aerospace 2000 Conference, Big Sky, MT, 2000 (7 pgs.).

The National Academy of Sciences, Self-Configuration and Adaptive Coordination, Embedded, Everywhere: A Research Agenda for Networked Systems of Embedded Computers, 2001, pp. 76-118.

Seltzer, Margo et al., Self-Monitoring and Self-Adapting Operating Systems, Harvard University, 1997 (10 pgs., with directory).

Diakov, Nikolay et al., Monitoring Extensions for Component-Based Distributed Software, Jul. 11, 2000 (8 pgs.).

Diakov, Nikolay et al., Monitoring of Distributed Component Interactions, 2000 (12 pgs.).

Diakov, Nikolay et al., Design and Implementation of a Framework for Monitoring Distributed Component Interactions, 2000 (13 pgs.).

SAS Institute, SAS/OR: The QSIM Application, 1999 (14 pgs.).

European Patent Office, Supplementary European Search Report and Written Opinion dated Dec. 27, 2007 and Apr. 15, 2008, respectively, from related European Patent Application No. 03749337.

PCT International Search Report dated Feb. 17, 2004 of International Application No. PCT/US2003/027097 filed Aug. 28, 2003.

European Patent Office, Supplementary European Search Report and Written Opinion dated Jul. 20, 2007 2007 and Nov. 5, 2007, respectively, from related European Patent Application No. 03791944.

Spivey et al, "A Component Architecture for FPGA-based, DSP System Design", Proceedings of the IEEE International Conference on Application-Specific Systems, Architectures, and Processors, 2002, IEEE International Conference on Jul. 17-19, 2002, Piscataway, NJ, USA, IEEE Jul. 17, 2002, pp. 41-51, XP010601458, ISBN 0-7695-1712-9.

Chou et al, "IPChinook: An Integrated IP-based Design Framework for Distributed Embedded Systems", Proceedings of the 1999 Design Automation Conference, 36th DAC, New Orleans, LA, Jun. 21-25, 1999, Proceedings of the Design Automation Conference, New York, NY, IEEE, US, Jun. 21, 1999, pp. 44-49, XP000887843, ISBN: 0-7803-5560-1.

Fleishman et al. "Java Driven Codesign and Prototyping of Networked Embedded Systems" Design Automation, 1999, 36th Annual Conference on New Orleans, LA, USA Jun. 21-26, 1999, Piscataway, NJ USA, IEEE Jun. 21, 1999, pp. 794-797, XP010762128, ISBN: 1-58113-109-7.

Bellows et al, "JHDL-An HDL for Reconfigurable Systems" FPGAS for Custom Computing Machines, 1998, Proceedings, IEEE Symposium on NAPA Valley, CA, USA, Apr. 15-17, 1998, Los Alamitos, CA USA, IEEE Computer Soc, US, Apr. 15, 1998, pp. 175-184, XP010298180, ISBN: 0-8186-8900-5/98.

Logan et al, Application of Foresight's Technology to Implement a Waveform Development Environment', 2001, p. 1-7 (hereinafter Logan) http://www.foresightsystems-mands.com/white/MILCOM_2001_final.pdf.

Armstrong, Rob et al., Toward a Common Component Architecture for High-Performance Scientific Computing, Proceedings of the 1999 Conference on Distributed Computing, 1999 (reprinted from website, Nov. 11, 2002) (17 pgs.).

Lillington, John, The Pipelined Frequency Transform, RF Engines Limited White Paper, Feb. 20, 2002, ref. No. PFT 001.Rev2 (13 pgs.).

Myers, Cory et al., Rapid Development of Signal Processors and the RASSP Program, Apr. 20, 1994 (8 pgs.).

Gardner, W.B. et al., An Object-Oriented Layered Approach to Interfaces for Hardware/Software Codesign of Embedded Systems, Proceedings of the 31st Hawaii International Conference on System Sciences, 1998, vol. VII, IEEE, Kona, Hawaii (11 pgs.).

Saul, J.M. et al., Hardware/Software Codesign for FPGA-Based Systems, Proceedings of the 32nd Hawaii International Conference on System Sciences, 1999, IEEE (10 pgs.).

Donaldson, Jane, From Algorithm to Hardware—The Great Tools Disconnect, Oct. 2001, COTS Journal (14 pgs.).

Lim, Davin, et al., Two Flows for Partial Reconfiguration: Module Based or Small Bit Manipulations, XILINX XAPP290 (v1.0), May 17, 2002 (23 pgs.).

Common Component Architecture Forum, CCA Forum, 2002 (42 pages).

Haji, K. et al., A Reconfigurable Computing Platform for Detection and Direction Finding of Frequency Hopping Signals, Southwest Research Institute (8 pgs.).

Schmidt, Douglas, A Tutorial on the Lightweight CORBA Component Model, http://www.cs.wustl.edu/%7Eschmidt/OMG-CCM-Tutorial.ppt (257 pgs.).

Sanz, Ricardo, CORBA Control Systems White Paper, Nov. 13, 2003, http://www.omg.org/docs/realtime/03-11-07.pdf (76 pgs.).

* cited by examiner

TmpPkg / Generalization

OBJECT ORIENTED COMPONENT AND FRAMEWORK ARCHITECTURE FOR SIGNAL PROCESSING

RELATED APPLICATIONS

This is a divisional of co-pending U.S. patent application Ser. No. 11/063,951 filed Feb. 23, 2005 entitled Object Oriented Component and Framework Architecture for Signal Processing, now U.S. Pat. No. 7,559,056, which is a continuation of U.S. patent application Ser. No. 10/233,338, filed Aug. 30, 2002, now abandoned.

FIELD OF INVENTION

This invention relates to distributed signal processing systems and more particularly to the use of object oriented techniques to provide a reconfigurable signal processor.

Computer Program Listing Appendix

One compact disc was filed in conjunction with this application. The compact disc includes a program listing of a program embodiment illustrated in greater detail below. The contents of the compact disc are incorporated by reference as if fully set forth herein. The

| Filename | Creation Date | Size |
| --- | --- | --- |
| Component Base Classes.doc | Apr. 14, 2009 | 1.4 MB |
| Framework Manager.doc | Apr. 14, 2009 | 237 KB |
| IDL.doc | Apr. 14, 2009 | 107 KB |
| Processor Manager.doc | Apr. 14, 2009 | 262 KB |

BACKGROUND OF THE INVENTION

Historically, signal processing has been performed using a combination of special purpose hardware and software designed for the specific digital signal processor environment used in a particular application. At times when no real-time operating system was available, the programmer had to be concerned with every detail of memory management, communications and scheduling. Even when real-time operating systems such as VxWorks have been available, the signal processing programmer typically needed to be concerned about the specific memory, input/output, and communications architecture of the processor used.

As a result, signal-processing software was difficult to reuse. In the past, signal processing has placed strong demands on processing throughput, often approaching the entire processing capacity of the computer or computers used. To maximize performance for the capability of a given computer or set of computers, the design and implementation of the signal processing software was closely tied to the particular hardware architecture and was also closely tied to the particular operating system and related libraries previously developed. Hence, reuse was difficult due to the fact that this signal processing software was closely tied to the particular hardware architecture and operating system used. This signal processing software required optimization for a particular application and was designed for specific functionality rather than to comply with an overarching architecture for reuse. Presently, due to the complex nature of signal processing tasks involved, specialized equipment and software is developed for each and every one of the signal processing requirements. What results is a multiplicity of processor types, a multiplicity of operating systems, and a multiplicity of hardware components, none of which are reusable from one application the other.

With the advent of more capable general-purpose processors and operating systems, whether real-time or not, it became possible to consider a more general and reusable approach to signal processing.

Many vendors now provide computer modules in the form of cards with one or more processors, memory, and input/output with high performance and integral communications capabilities. These communications are often provided by dedicated hardware on the computer modules and are usually designed to be scalable so that as modules are added to the system, the communication bandwidth is also increased. However, generally these computer modules are dedicated to one specific type of operating system and related libraries. The task of reusing signal processing applications when converting from one computer module to another, particularly between different vendors, remains a difficult, time consuming, and expensive task.

There is therefore a need to find means to exploit modern hardware and software engineering approaches to define an architecture for signal processing that would allow for software reuse and rapid system development owing to that reuse. It is also important that the architecture developed not be tied to any particular processor type or hardware so that one can quickly take advantage of processor improvements, or at least not fall victim to the disappearance of a particular processor type or hardware from the commercial marketplace.

For instance, in an airborne communication, command, and control payload, there are various functions that such a system must perform. These include a communications relay function, signals intelligence processing function, acoustic signal exploitation function, and identification of friend-or-foe function. In the past, each of these functions required a separate set of processors and specialized hardware. The payload system integrator was required to incorporate in the equipment bay a number of highly independent sub-systems of specialized equipment, because common equipment could not be reused or reconfigured to provide the required functionality. In the equipment performing the signal intelligence processing, one needs to have a receiver interface, a signal energy detection system, signal recognition capability, radio direction finding capability and a countermeasure system that can include jamming. Each of these functions was priorly performed by separate processors and specialized hardware. It is interesting to observe that the a communications relay function, acoustic signal exploitation function and identification of friend-or-foe function require similar, if not identical capabilities.

In the past, in order to accomplish each of the above-named functions where one has very limited payload restrictions, the payload equipment and software was selected prior to flight in which only one capability was permitted per mission. It is desired to be able to reuse various processing capabilities and hardware capabilities for multiple tasks, permitting multiple capabilities per mission.

Thus, one of the major problems with writing software for signal processing in the past has been the inability to reuse software that previously has been developed for specific applications and particular hardware suites.

Previously, distributed signal processing applications were so demanding that they were written to be tightly coupled to a particular computer platform, a particular operating system, and the communications infrastructure that was being used. Reuse for different applications was virtually impossible.

Further, when the computer platform changed or the communication infrastructure changed, that software had to be rewritten.

SUMMARY OF THE INVENTION

In order to solve the problem of having signal processing performed using a combination of special purpose hardware and software designed for the specific digital signal processor environment used in a particular application, in the subject invention, an object-oriented system or architecture is used to provide an overarching architecture for reuse. With the advent of more capable general purpose processors and operating systems, whether real-time or not, the subject system makes it possible to consider a more general and reusable approach of signal processing.

As a result, in the subject invention, object-oriented component/framework architecture is used with several key attributes.

The first is that the framework provides many underlying infrastructure capabilities needed by signal processing systems such as various means of communication, code downloading, processing control, error logging and other functions.

Secondly, the framework is layered so that the details of the interface to the hardware, processors and communications are isolated in specific layers. The signal processing application software in the upper layer is isolated from the operating system, communication infrastructure, and processor hardware. This localizes any changes in the system required for easy porting to new processors to the lowest layers, and as a result, investment in the signal processing application is preserved.

Thirdly, signal processing techniques and algorithms are encapsulated in components that perform their individual functions without explicit dependency or direct interaction with any other components in the system. This makes the designed component highly modular and more reusable. Each component must meet the required interfaces to the framework to ensure proper operation of the overall system.

Fourthly, all components take advantage of the object-oriented approach to inherit much of their capabilities from component base classes that provide commonly needed capabilities to fit into the framework and overall system architecture. This approach facilitates rapid development for new components from direct reuse of much common software code. Further, these component base classes provide the interface between the components and the interface from the components to the framework, relieving the burden of complying with these interfaces from the software component developer.

Fifthly, the framework and component approach embodies a standardized signal or streaming-data processing architecture to implement many different signal or streaming-data processing applications. In order to perform a specific processing application, reusable and reconfigurable software components are deployed and execute on one or more interconnected computers. Each of these processors is coupled to a data communication fabric that provides interconnection of messages from each processor. In typical embodiments these are buses, switched circuits, or combinations of both. Each computer has a Processor Manager, an executable program part of the framework which orchestrates framework infrastructure services for that particular computer and the components that execute there. The entire signal processing system is under the governance of a Framework Manager, another executable part of the framework that deploys, connects and runs the components in accordance with a Plan. The Plan defines the signal processing task or tasks by specifying the components to be used, the computer or computers to execute each component, the interconnection of the inputs and outputs of each of the components, and the parameters that control the behavior of each of the components.

The subject system thus meets the need to greatly increase the ability to reuse software from one signal processing application to the next. In addition it makes the process of porting to the next generation computing hardware a much faster and easier process. By contrast, in the past most applications had to be redesigned and recoded to operate on each new hardware computation platform. It became sadly apparent that by the time one could complete that effort, this computation platform would no longer be a state-of-the-art, and a time-to-market window might have been missed. What was therefore needed was a leapfrog technology to be able to access state-of-the-art components and to arrange them in an object-oriented framework architecture to perform the signal processing.

The subject system defines a component-framework architecture to be used for signal and streaming-data processing. Except for a specific hardware interface layer, it is hardware independent, and uses a modern object-oriented approach so that the software can be reused. The subject architecture also promotes portability and the ability to take advantage of rapidly evolving, highly capable, general-purpose commercial off-the-shelf processors.

The following U.S. patents detail object-oriented programming frameworks and their use in applications other than signal processing: U.S. Pat. Nos. 6,424,991; 6,195,791; and, 6,308,314

In summary, a reconfigurable distributed signal processing system uses an object-oriented component-framework architecture in which the processing system architecture permits large-scale software reuse. This is accomplished by the use of a reusable, layered framework and a number of reusable, reconfigurable software components that are both highly modular and hardware independent. The components communicate over a data fabric using open published APIs and one or more data communications mechanisms. Interchangeable software components are used that perform the signal processing. Interchangeability is assured by each component meeting a required interface; the component inherits the required interface elements from component base classes. This use of inheritance to assure interface compliance also reduces the programming work required for developing a component. Most importantly, the interchangeable components are reconfigurable into various systems at runtime, as defined by a Plan. A Plan is a schematic of the configuration of the various components to be used to solve a particular signal processing problem which includes the list of components, what computer each component is to execute on, how the components are interconnected, and the initial parameter values of the components. The system functionality and capability can be reconfigured at runtime based on a Plan read by a software element of the framework, the Framework Manager.

Moreover, the source code for the components is platform independent since all the software which interacts with the operating system and the computer hardware is isolated in separate software layers with well defined interfaces based on well-recognized industry standards. Since the approach allows the use of multiple independent hardware and operating system interface layers at the same time, the system is able to use heterogeneous commercial off-the-shelf hardware to minimize equipment costs and lower non-recurring engineering costs as well. The system uses object-oriented software development and programming in a well-defined architecture to enable large-scale reuse as a way to reduce time to market and to ensure program success.

The required interfaces for each interchangeable component include the component-framework interface, input ports, output ports, parameters, plots, statistics, and error handling. The components do not communicate directly with specific other components but only through their interfaces with the framework. The components themselves inherit from the component base classes characteristics to ensure interface compatibility and to dramatically reduce programming work required when developing the component. The list of classes from which the component inherits includes a component controller, a transform, input and output ports, a plot and/or statistics ports.

It will be appreciated that the subject system is platform independent in that the component uses the Operating System Application Programming Interface, or OSAPI, not native calls, meaning that the operating system interfaces are not used directly. Since each operating potentially has a different interface, instead one uses a specialized OSAPI layer that translates from a standardized interface to the specialized interface of each native operating system.

In operation, a Plan is devised and is passed to a Framework Manager which deploys the components to the various processors through a Processor Manager and connects the output ports to the input ports for each of the components, sets the component parameters, sets the parameters on the output ports, starts the particular components and monitors the health of the system.

The subject system is therefore configurable using independent, reusable, interchangable components executing on one or more computer nodes interconnected by a data fabric or bus structure to which is coupled the Framework Manager and various processors, with the Plan being inputted to the Framework Manager for the overall reconfiguration and control of the signal processing system. What one has achieved is thus a reconfigurable signal processing system that can be reconfigured at runtime.

BRIEF DESCRIPTION OF THE DRAWINGS

These and other features of the subject invention will be better understood in connection with the Detailed Description in conjunction with the Drawings, of which.

DETAILED DESCRIPTION

Basic Architecture

Figure 1:
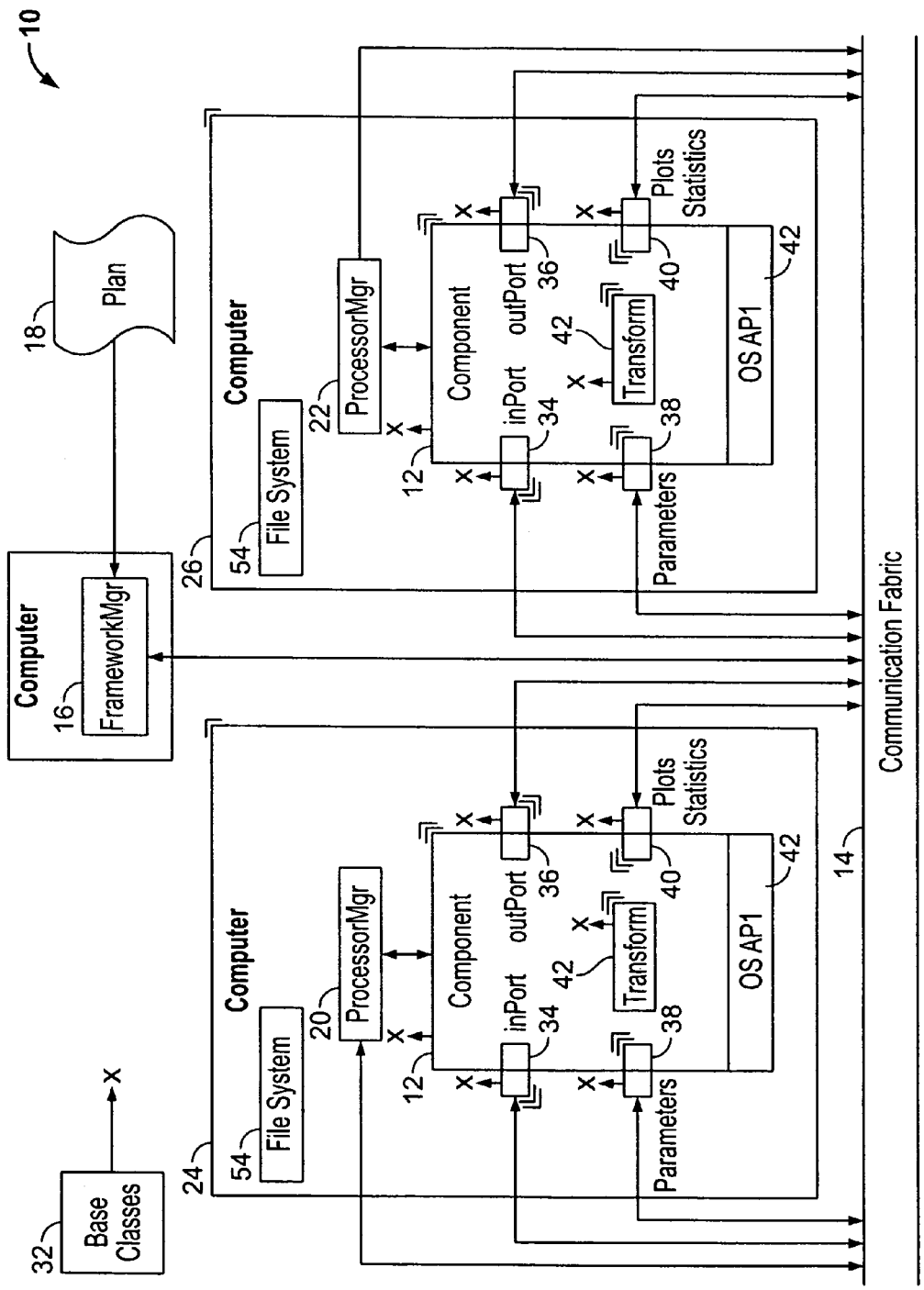
FIG. 1 is a block diagram of the subject system illustrating the connection of a framework manger, components, and process manager to a communications fabric.

In order to provide for the subject framework architecture for signal processing, a system 10 includes a number of components 12 and 13 which are connected through a communication fabric 14 to each other and to a Framework Manager program 16, which is provided with a Plan 18 for defining the system. Each of the components is coupled to a respective Processor Manager program 20 and 22, with the components executing on a number of respective computers 24 and 26, each computer having its associated Processor Manager 20 and 22.

The communication fabric permits communication between the components of the Framework Manager and associated Processor Managers as well as computers so that system can be reconfigured based on Plan 18 read by Framework Manager 16.

It will be noted that each of the components have standardized interfaces, namely an one or more input ports 34, one or more output ports 36, parameters port 38, and a plot port/statistics port 40. These interfaces are managed by objects: an input port object manages the input port interface, an output port object manages the output port interface, a parameters object manages the parameters, and another parameters object manages the statistics interface. Further, a plot object manages the plots interface. Components also include a transform object 42, the purpose of which is to instantiate the particular function that the component is to perform.

Each component has access to the native operating system only by interfacing through the Operating System Application Programming Interface, OSAPI, 42 so that regardless of the particular computer or operating system used, the component operating system interactions are transformed to that of the particular computer and operating system.

In operation, the system described in FIGS. 1 and 2 operates as follows: For a particular signal processing application a system designer or application engineer first constructs a Plan 18. A Plan is a preformatted file representing a schematic of the configuration of the various components to be used to solve a particular signal processing problem. It defines components, their interconnections and interconnection communication methods, and initial parameters to control component activity. Components may be assigned to particular computers, useful when certain computers have input/output interfaces with particular hardware such as signal digitizers required by the specific component. Optionally, the Framework Manager will assign components to computers at run time. The plan is prepared separately based on tasking for the system.

On system boot-up the Framework Manager is loaded and started. The Framework Manager starts a process thread that monitors requests from Outside Application Programs 50 which seek to task or control the system. Once any outside application sends a message to a pre-defined port, the Framework Manager accepts it and establishes an identity and reference for that application.

As each computer in the system boots up and comes on-line, the Processor Manager program is loaded and started on each participating computer in the system. Each Processor Manager broadcasts a UDP packet to register with the Framework Manager indicating that it is present and ready to accept components. This message is received by the Framework Manager, which acknowledges each processor manager. As the Framework Manager establishes communications with each Processor Manager it develops a list of all the computers having a Processor Manager. These computers with Processor Managers are the available processing assets.

The Outside Application requests that the Framework Manager load the pre-constructed plan for operation. Typically more than one plan can be in operation at the same time in the same system. In fact multiple plans can share components provided the identities of those are the same in both plans.

The Framework Manager analyzes the Plan and deploys the particular components onto computers 24 and 26 as dictated by the Plan and the available computers. This is accomplished by the Framework Manager passing the name or names of the component or components for that computer to Processor Manager 20 or 22 on that computer. It will be appreciated that one or more of the many processors in the system may have failed and therefore their Processor Manager isn't able to register with the Framework Manager so the plan can be configured around the failure. Each Processor Manager then downloads the requested components for its particular computer. The components then register with the Processor Manager that in turn tells the Framework Manager that the component is loaded. The Framework Manager maintains a list of components and their locations. From time to time, for example every second, the Processor Manager sends a message to each component deployed on its computer to determine whether each component is still functioning normally. Failed components are unregistered and the Processor Manager notifies the Framework Manager that in turn logs the condition and notifies the outside application.

The Processor Manager starts the execution of component 12 and this occurs for each of the components identified in the Plan.

The Framework Manager also analyzes the Plan and identifies the parameters for the particular components. The Framework Manager communicates via parameter interface 38 in setting the parameters for the particular component to the correct default values as identified in Plan 18. Again, this occurs for each component in the Plan.

Next, the Framework Manager analyzes the Plan and identifies the connection or connections between the output ports 36, outPorts, of the components and the input ports 34, inPorts of the components. This connection-based communication mechanism is peculiar to signal processing where streams of data are passed between the components to perform the aggregate system processing required. The Framework Manager looks in its processor list and obtains the identity and reference for the source and destination components. The connection is established between the output port and the input port by the Framework Manager communicating to the output port 36 a list of destinations which are the identities of the input ports on each of the components that are to be connected. To do this the Framework Manager obtains the input port reference from the destination component and the output port reference from the source component. The port types are compared against the Plan to ensure validity. If they are valid, the Framework Manager tells the source component to connect its output port to the input port of the destination component. The output port then sends a message to the input port instructing it to accept data or events from the particular output port. This again is repeated for each connection specified in the Plan. Using this method it is possible for an output to be received by multiple input ports and for a single input port to listen for data or events from more than one output port. Note that these connections are established at runtime. These connections may also be removed and reestablished from one component to other components, hence, making the system reconfigurable at runtime.

Various methods for communication are available within the system and represented by the communication fabric 14. Physical connections, including busses, point to point connections, switched data fabrics, and multiple access networks are abstracted by logical layers in the system so that several logical connection types are available for communication between components. In one embodiment, the default specifies remote object method calls via a real time object request broker, ORB. The ORB complies with the industry standard Common Object Request Broker Architecture, CORBA and is implemented by an off-the-shelf product. This selection is in keeping with the underlying object-oriented architecture of the system, but can be changed. Other communication means include sockets, which are supported by the target operating systems, and the native communications protocols of the switched fabric interconnects being used. One example is GM over Myrinet. The Plan defines the communication type and that type is sent to the ports when the communications are established as defined above.

Finally, when all the deployment and connections are completed, the Framework Manager starts each of the components using the start method on the component interface of each of the components 12. Upon invocation of the start method, the components commence processing any signals or events arriving at the component input port or ports and may output signals or events from output ports.

If the parameters of a component need to be changed, Outside Application Program 50 first needs to determine the available parameters. Via the ORB it calls the component to request definition of its parameters. The component returns the available parameters. The outside application can then call the component to request current parameter values, change the parameter values, or register to be notified when parameters are changed by some other means, ie. another outside application. Then when parameters are modified the component notifies all registered applications of the change. When it is finished the outside application calls the component to unregister for notifications.

Components

Figure 2:
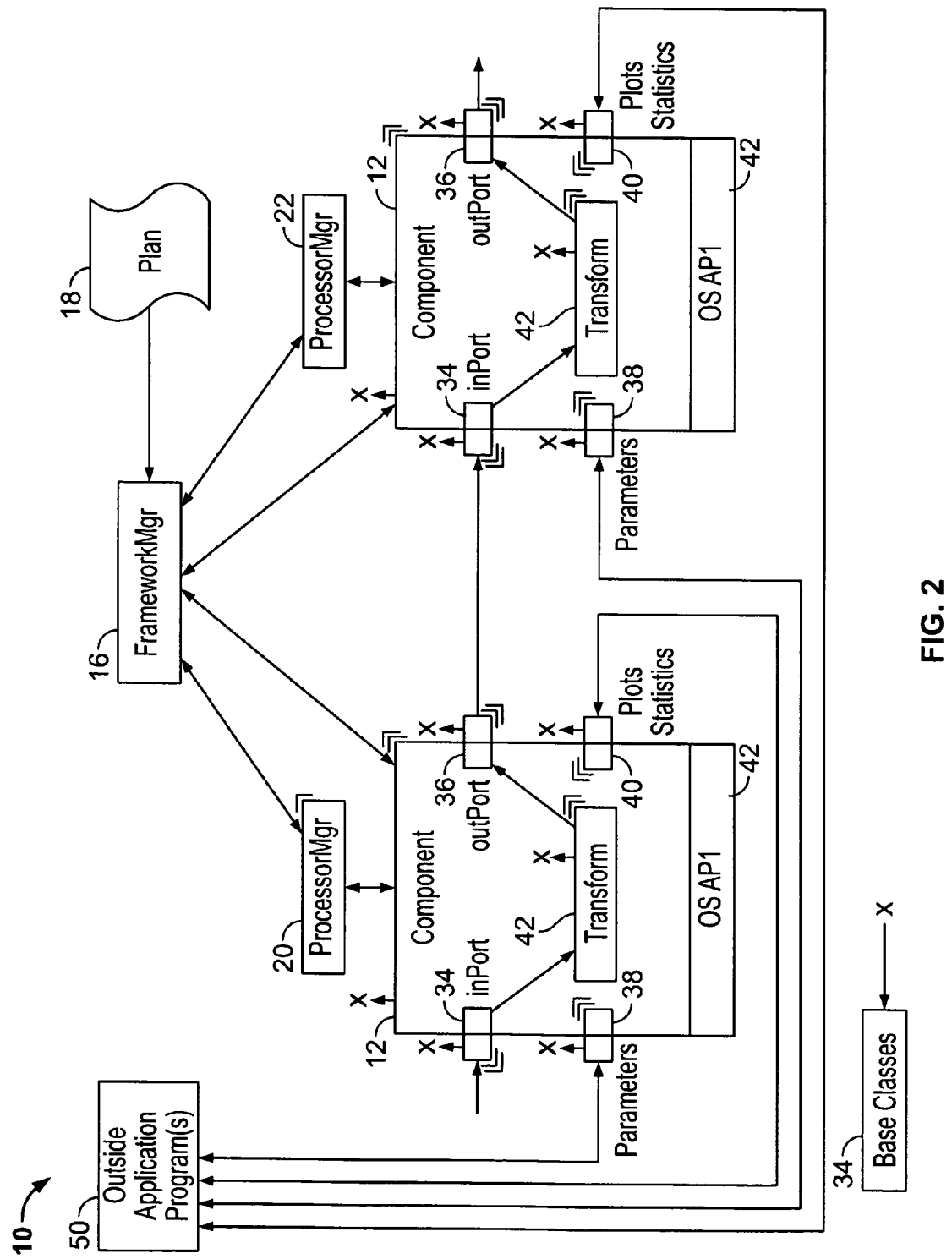
FIG. 2 is a block diagram showing the system of FIG. 1, showing the interconnections of the parts logically rather than all going through the communications fabric.
Figure 3:
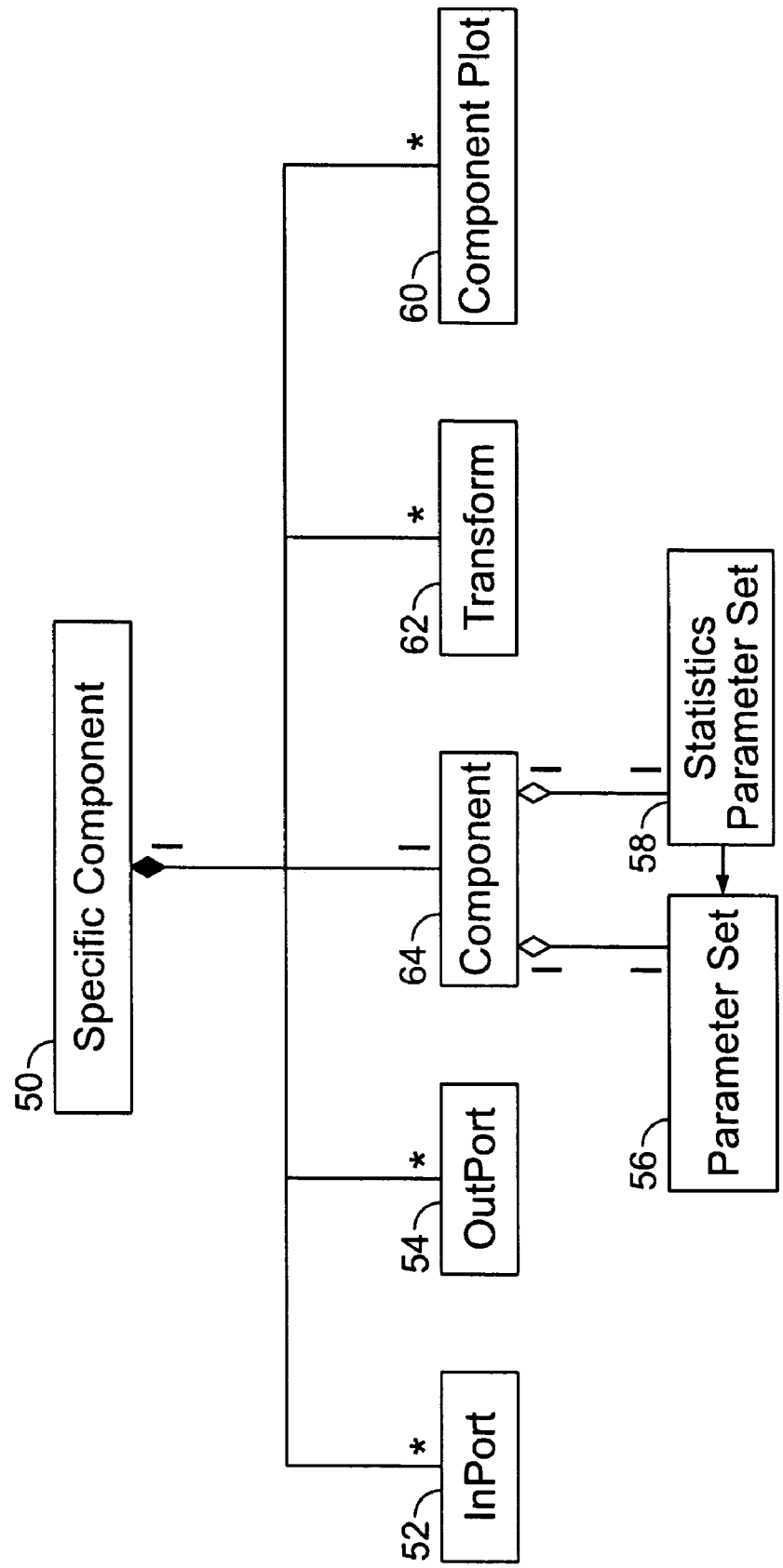
FIG. 3 is a diagrammatic illustration of a Unified Modeling Language, UML, class diagram for the structure of a component.

The component, itself an executable program, has required interfaces as shown in FIG. 2, namely an input port 34, an output port 36, parameters 38, plots and statistics 40. These interfaces are managed by objects in one embodiment as shown in the standard Unified Modeling Language, UML, class diagram of FIG. 3. The specific application component 51 has an input port object 52 which manages the input port interface; an output port object 54 which manages the output port interface; a parameterSet object 56 which manages the parameters; a Statistics ParameterSet object 58 which is another ParameterSet that manages the statistics interface; and a ComponentPlot object 60 which manages the plots interface. Components also include a Transform object 62, the purpose of which is to implement the particular function that the component is to perform. The statistics and parameters are part of the Component object 64 which provides control for the overall component.

Each of the components is similar in that it performs a cohesive processing step and meets the same interface. In addition to requiring that each component meet this defined interface, the classes that define objects that manage the interfaces, input port class, output port class, parameters class, and plot class, all inherit their underlying capabilities from the corresponding base classes. The base classes provide a guaranteed interface outside the component and provide default useful functionality. This reduces the amount of specialization a particular software developer is required to create in order to have a fully functioning component.

The transform is an object that performs the required signal processing work. These are generally different for each component providing the specialized transformation of data that is done as part of the signal processing. There can be one or many of the transforms in each component.

However, the basic form of each these objects which together form a component, input port, output port, component, transform, parameters, statistics, plots, is the same and they are guaranteed to be compatible with the interface because they inherit from the base classes. The input port base class provides an interface to receive data or events. The component base class provides an interface to the framework and the Processor Manager for identification of the basic control of transforms and the ports. The transform base class provides a simple interface to be used by the component developer. The plotting base class provides engineering and plotting interface used typically for debugging and analyzing problems in the components. Using the plotting interface, arrays or vectors of numbers in the memory of the component may be rendered as signals graphically. The need for this visualization capability is unique to signal processing. The output port, again, provides the means of outputting signals from the component using common mechanisms.

Example

Figure 4A:
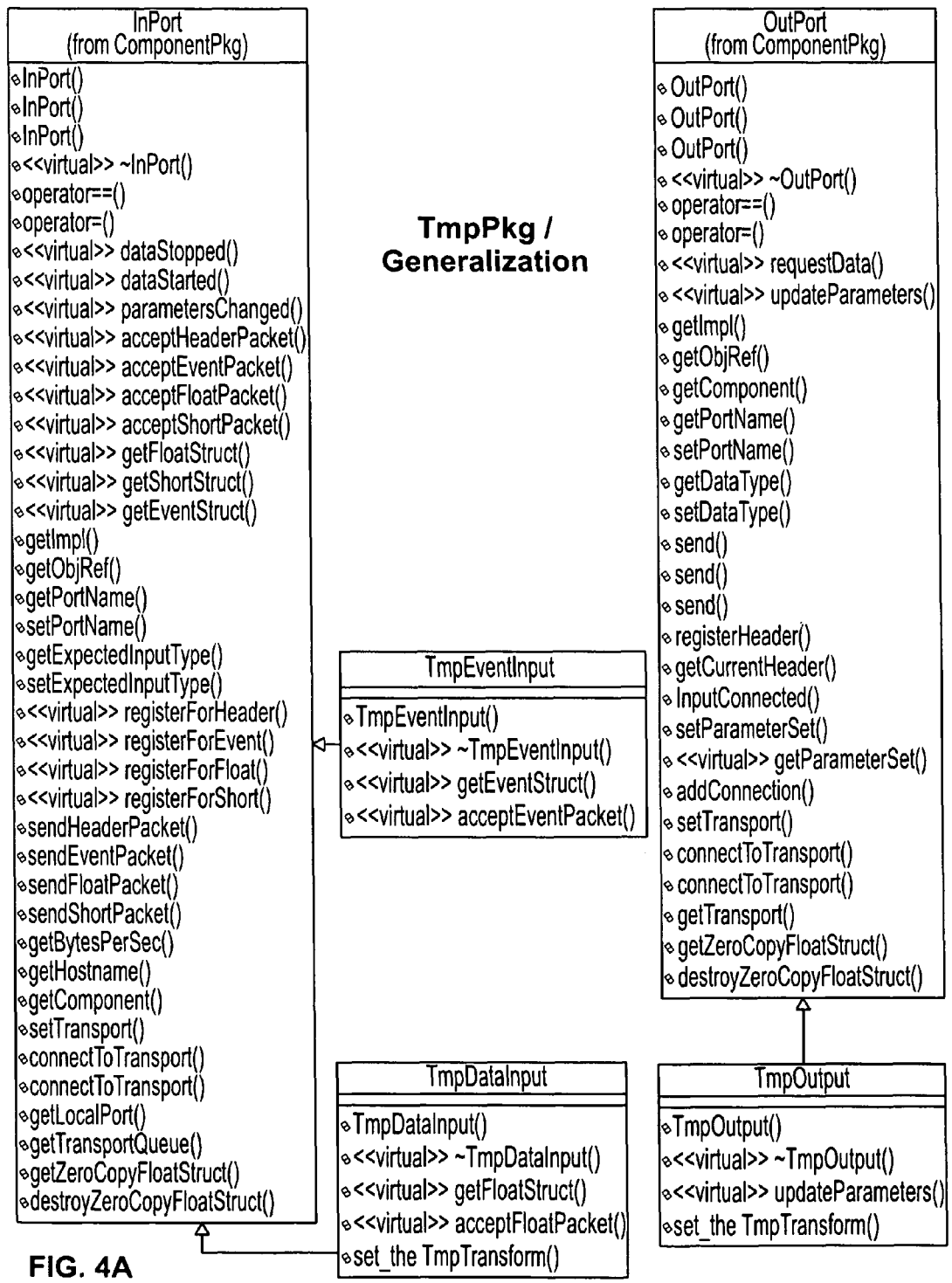
FIG. 4 is a UML class diagram for an example simple component called TMP.
Figure 4B:
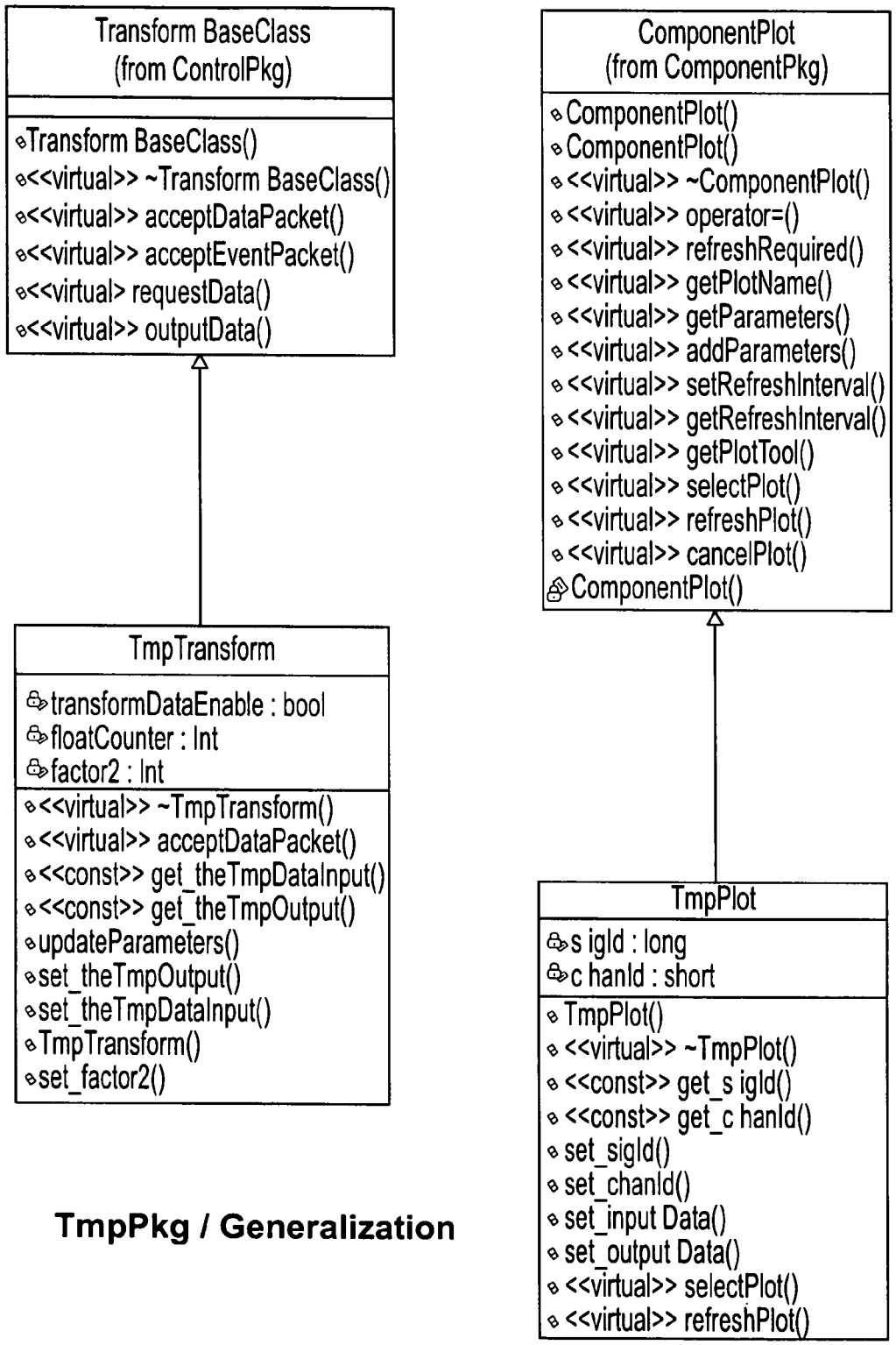
Figure 4C:
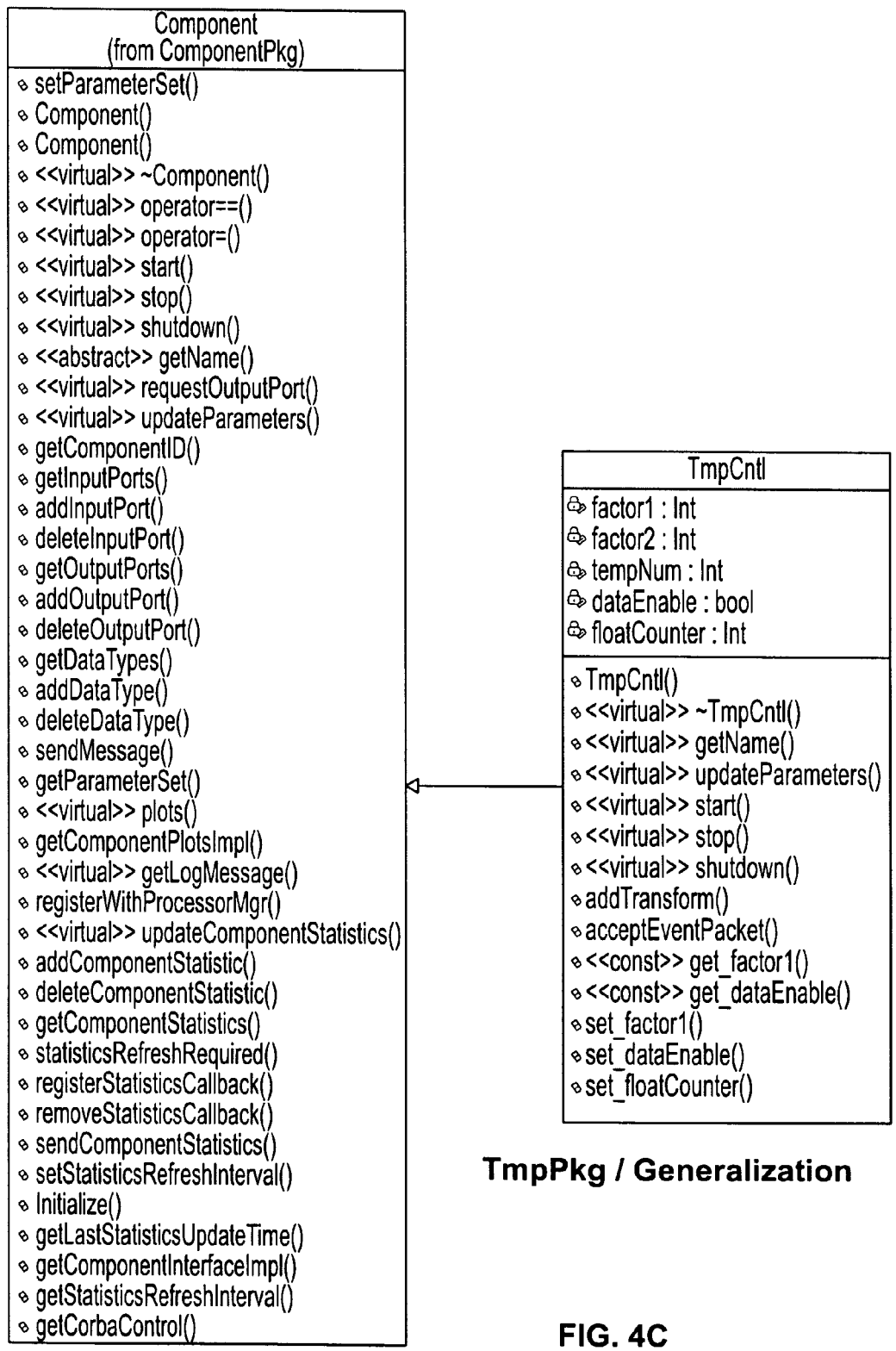
Figure 5:
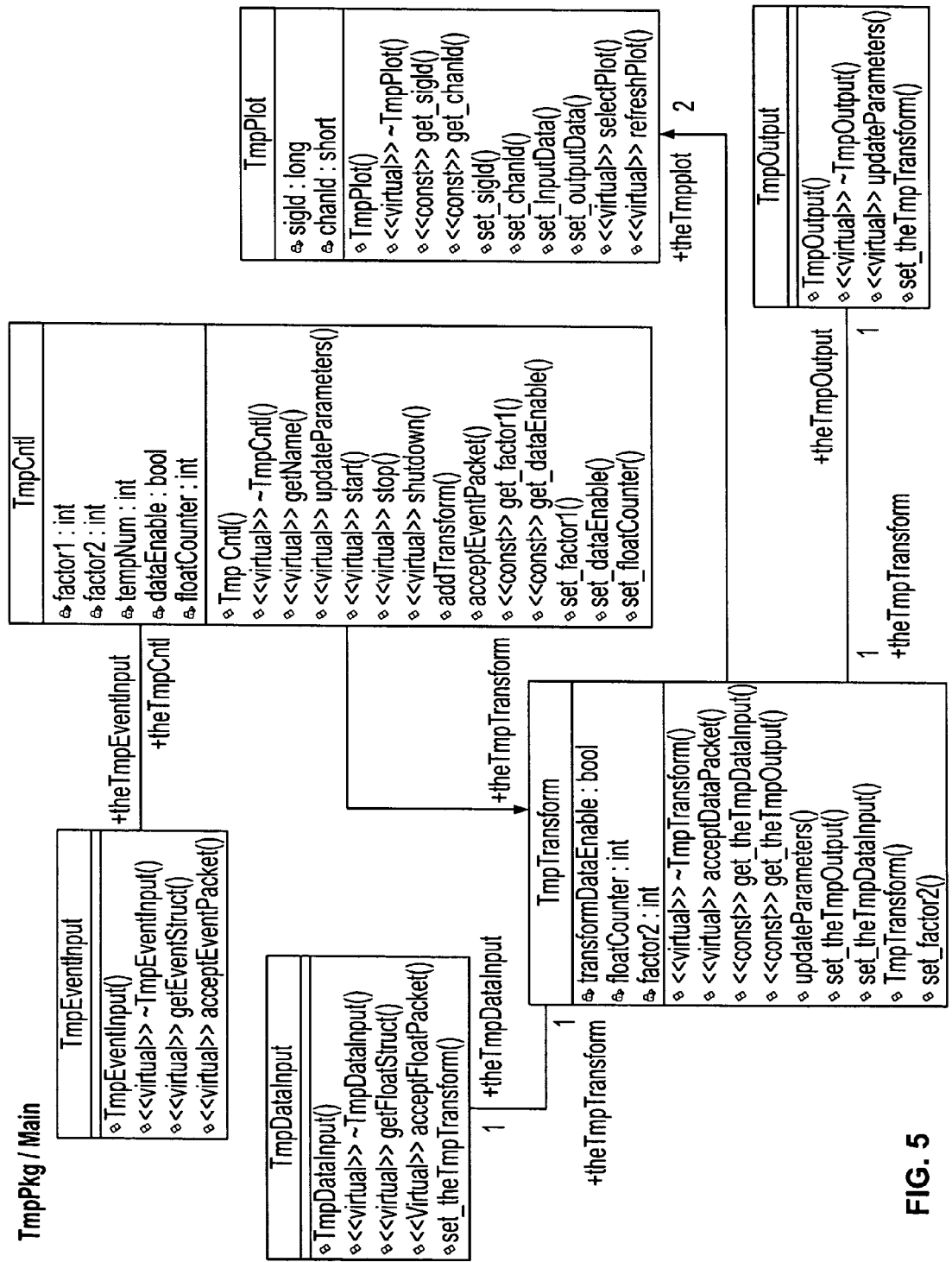
FIG. 5 is a UML class diagram showing associations for the simple TMP component; and, FIG. 6 is a diagrammatic illustration of the layered architecture of one embodiment of the subject invention.

Each component developed to be interoperable, is developed by extending the base classes for the input port, output port, component, transform, and plots, and using the parameters class. Referring to FIG. 4, a simple example component, the TMP component is presented. Each of the base classes are extended for the particular specialized additional capability required for the particular component.

Note: for purposes of illustration, and as one example of a practical embodiment of the subject invention, the C++ language representation for methods is used. Other embodiments of this invention may use other object-oriented programming languages, such as JAVA. The specific method names identified herein are only as an example of one embodiment of this invention.

With respect to the input port, the base class for the input port is the InPort class. InPort is used by the component writer and is extended for the particular component. In the case of the TMP component, the tmpDataInput and TmpEventInput classes each extend the inPort base class. The purpose of the input port is to accept signal data or events into the component. The inPort class has a number of methods that the component writer uses and extends. Signal data or events are decomposed into packets for transmittal across the data communication fabric between output ports and input ports. The input port accepts three types of data packets that are essential for signal processing. These consist of headers and a payload. The headers provide auxiliary descriptive data, so-called side-channel data representing where, when and how the data was collected, and possibly processed. The first two types of data, shorts and floats are two types of signal data where the values in this data represent sampled signal data. Real or complex data may be passed. The third type of data is data which represents events, typically processing results which are representative of single action activities in time, which serve as triggers for subsequent signal processing.

Component Inputs

The inPort base class has methods for initialization and shutdown. The constructor InPort( ) and destructor ~InPort( ) are extended by the component developer to become the particular inPort that is used for the particular component. In the example, these extended or specialized methods are Tmp-DataInput( ) and ~TmpDataInput( ), for the TmpDataInput class, and TmpEventInput( ) and ~TmpEventInput( ) for the TmpEventInput class. The constructor is used to create all the required data structures for a particular object of class inPort. Likewise the destructor is used to delete them. Methods are provided for message registration permitting the component to identify if it wants to receive incoming signal or event packets, which are registerForHeader( ) and registerForEvent( ) registerForFloat( ), and registerForShort( ). Until there is registration, no data is passed. The methods for registration for messaging are generally not overwritten, but the base class method is used directly, as in the example. These methods generally provide all the essential functionality needed by the port. Methods are also provided for message buffer management: getFloatStruct( ), getEventStruct( ), getZeroCopyFloatStruct( ) and destroyZeroCopyFloatStruct( ), which allow the extended component to specially manage memory for incoming packets. Typically, the methods for message buffer management are used directly as inherited from the base class. However, these may be overloaded by the component writer for special customized buffer management. There are methods for the receipt of messages: acceptHeaderPacket( ), acceptFloatPacket( ), acceptShortPacket( ), acceptEventPacket( ). These methods must be overloaded by the component, and generally are the entry point for the signal processing algorithm software. These methods are invoked by the input port upon receipt of the packet message at the framework interface of the input port, providing of course the appropriate registration method has previously been invoked. These methods execute the signal processing, typically by making a method invocation of a method in some object, often the transform object, that will actually perform the signal processing. In the example, the acceptFloatPacket( ) methods of TmpDataInput invokes the acceptDataPacket( ) method of the object of class TmpTransform. In the example, the acceptEventPacket( ) method invokes the acceptEventPacket( ) method of the controller, the TmpCntl class, to set the attribute dataEnable of the controller. For additional utility there are miscellaneous methods used by a component developer and the Framework Manager. These include setPortName( ) getPortName( ), which allows the components to set and retrieve an identification character string for the input port. The method getExpectedInputType( ) allows an application to query the inPort to see what type of data is it expecting to receive. Likewise the method, setExpectedInputType( ) establishes that. The method getBytesPerSecond( ) allows objects within the component to obtain the amount of data passing through the input port. These miscellaneous methods are generally not overloaded by the components developer as they provide all the required functionality directly from the base classes.

The above methods are common to all the signal processing and are used by the component input port to launch the signal-processing within the component. It will be appreciated that the few data types accepted and processed by the inPort base class accommodates all of the input signals that one would expect to receive in a signal processing system; they are reused no matter what type of specialized signal processing is provided by the transform within the component.

The input port also interfaces with the framework to actually receive the communication of data or events from the output port of some other component. This framework side of the interface has an acceptFloatPacket( ), acceptShortPacket( ), and acceptEventPacket( ) method. In one embodiment, these exterior methods are implemented as methods of interface classes in IDL, the interface definition language for CORBA.

Additionally, this framework side interface has a method called addConnection( ) point which allows for connection-based communication mechanisms that establish a virtual connection from output port to input port along with an associated protocol handshake, as part of the communication link establishment sequence, when required by the communications mechanism.

Component Control

With respect to the component base class, the purpose of the component base class and the component, which is extended from the component base class, is to control the operation of the component itself. In the present example, the class TmpCntl extends the base class Component. Generally, this class is a singleton object, that is only one per component. The functionality of the extended component includes the initialization of the component, the setting up of the input ports, the output ports, the parameters and connection to the Processor Manager. The extended component class initializes the number of input and output ports needed and provides the start, stop, and shutdown mechanisms for the component.

A number of methods must be defined in the class extended from the component base class. These include the constructor and destructor, in this example TmpCntl( ) and ~TmpCntl( ). The component base class has methods to manage any data input/output activity. The start( ) method of the Component base class is overloaded in start( ) of TmpCntl class. This method is invoked when the component may emit data and initiate signal processing. Similarly, stop( ) is the method that is invoked by the framework to indicate the component is to stop emitting data. The requestOutputPort( ) method performs any necessary processing when the framework requests the creation of an additional output port. The component may either extend this, in that case adding the functionality or creating the new output port, or as in the example TmpCntl, may not overload this method if the component writer desires not to support this functionality in the component. The shutdown( ) method must be overloaded to clean up or stop any threads from being started and to remove any data structures created by new( ) or other similar memory allocation mechanism.

The method for getName( ) must be overloaded by the particular component, as is done in the example TmpCntl. This method returns a unique identifying string for the component. The methods to update the components statistics called update component statistics is also overloaded and methods to update components called parameters is called update parameters.

In the component base class there are non-virtual methods that are used un-extended from the component base class, as they provide to all the necessary functionality. These methods of the component base class include initialize( ), which is used to indicate any initialization is complete. The method getComponentID allows objects within the component access to the unique identifier for the instance of the component. A method sendMessage( ) is provided that is independent of operating system, compute platform, or available input/output devices to indicate error conditions. This method sendMessage( ) is used to send error messages to the Processor Manager, the Framework Manager and all who have registered to receive these error messages. Methods are provided to manage the input ports and output ports typically part of a component, and have associations with the extended component class. getInputPorts( ), getOutputPorts( ) return lists of the current input ports and output ports of that particular component. The methods addInputPort( ), addOutputPort( ), deleteInputPort( ) and deleteOutputPort( ) modify these lists of current input and output ports for the component. The component base class has a method getParameterSet( ) which allows objects in the component to have access to the parameter set class that controls component behavior. See below for a detailed explanation of the parameter set object.

Components have statistics allowing visibility at run-time to the processing operation of the component. Statistics are actually parameter sets that are output only, that is they do not permit changes to values external to the component. They provide a convenient mechanism for the component to present internal data to outside a component due to their self describing mechanism. Statistics are maintained within the component and may be queried and may be emitted periodically. The component base class provides methods to manage the statistics. The statistics typically represent information about the processing rate or effectiveness, such as samples processed per unit time, number of new signals detected, or other information germane to development and operation of signal processing systems. These methods include getComponentStatistics( ) providing access to the parameterSet object which is serving as the statistics object. During initialization, objects within the component may invoke the method addComponentStatistic( ) for each desired statistic, likewise during destruction the component invokes deleteComponentStatistic( ). The method sendComponentStatistics( ) sends the statistics to all objects that have registered. The component extends the component base class method updateComponentStatistics( ) to compute any new statistics values. Typically this is invoked just prior to sendComponentStatistics( ). A set of utility methods to manage the update timing of statistics is provided. The methods setStatisticsRefreshInterval( ) and getStatisticsRefreshInterval( ) establish and query the time between updates. The method statisticsRefreshRequired( ) is provided that the component invokes to test if the statistics refresh interval has a gain expired. In typical operation, if this method returns true, the updateComponentStatistics( ) and sendComponentStatistics( ) methods are invoked. Additionally, a convenience method, getLastStatisticsUpdateTime( ) is provided that permits objects within the component to ascertain when the last statistics update was performed. These methods offer a multiplicity of options for the component developer to manage statistics generation and reporting.

The component base class has as an attribute, a ComponentPlotSet object, which is a list of ComponentPlot objects. These plot classes will be described below. The component base class has an access method to the componentPlotSet, plots( ).

The component interfaces with the framework to receive method invocations to control the component, and to produce information requested of the component by the framework or outside applications. In one embodiment, these exterior methods are implemented as methods of interface classes in IDL, the interface definition language for CORBA. These exterior interfaces for the component include getting component attributes: getComponentID( ), getComponentName( ), and getHostName( ). The framework side interface to the component has the following methods: start( ) which starts the component operation, eventually invoking start( ) on the component, in the present example on TmpCntl; stop( ) which the framework uses to command the component to stop its operation, eventually invoking stop( ) on the component, in the present example, TmpCntl; shutdown( ) which the framework uses to command the component to prepare for shutdown and delete threads and to delete data structures, eventually invoking shutdown( ) on the component, in the present example on TmpCntl. Message logging is managed by enableMessageLogging( ) and disableMessageLogging( ) which are used to directly connect the sendMessage( ) from within the component to the frameworkManager and any other applications that have registered for error reporting. Graphical plotting applications outside of the component may invoke the getPlots( ) method, returning a list of plots the component has created and registered.

This framework interface to the component has access methods to the input and output ports. These access methods getInputPort( ) and getOutputPort( ) return the port, if one exists, given a name string of characters. Lists of input ports and output ports are available using the getInputPorts( ) and getOutputPorts( ) methods.

The parameters that control the behavior of the component are available to the framework and outside applications via the getParameter( ) method, and are settable via the setParameter( ) method. The definitions of the parameters are available via the getParameterDefs( ) method.

The statistics available within the component are available represented as parameters via getCurrentStatistics( ) and the definitions are available via the getstatisticsDefinitions( ) methods. A callback is established to request periodic statistics updated by the component by invoking establishStatisticsCallback( ), and may be canceled by invoking cancelStatisticsCallback( ).

The requestOutputPort( ) method allows the framework to request the component to create a new output port on demand, and calls the requestOutputPort( ) method of the component, if overloaded. The releaseOutputPort( ) method likewise will request the destruction of any newly created output port that was created this way.

Component Outputs

With respect to the output port interface, the OutPort base class provides two required functions inside the component. First, is the emission of the signal or event data that was just processed by the component. Again, this is in the form of float data or short data with a header or event data, for instance, when the signal-processing component is providing such detection and the detection actually occurs from the signal data that is fed into it. The second functionality of the output port is to manage parameters that are used to control the transform associated with the output port. In the example, the TmpOutput class inherits from the OutPort class. The parameters of this output port control the behavior of the TmpTransform class, which is associated with the TmpOutput class. The constructor OutPort( ) and destructor ~OutPort( ) are extended by the component developer to become the particular inPort that is used for the particular component, In the example these extended methods are TmpOutput( ) and ~TmpOutput( ). The OutPort base class has other methods that typically are used without extension, including getComponent( ) which allows the application to get the reference of the component that contains the outport, and getPortName( ) and setPortName( ), a string used to identify the outport to the Framework Manager. The send( ) method is the method invoked by the component or transform within the component to actually send the data from the output port of one component to the input port of another component.

There are methods to manage the output port parameters. These parameter controls the behavior of the transform associated with the outPort class. This includes the method updateParameters( ), which is a method of the extended outPort class, such as TmpOutput in the present example. This method is invoked when parameter values are changed, and contains the specific behavior programmed by the component developer to occur upon changes in parameters of the OutPort. The methods of the base class getParameterSet( ), and setParameterSet( ), are used by the component or transform to define the set of parameters typically during construction of the OutPort object, and to get the current parameter set object.

The output port also has an interface to the framework to actually communicate data or events to other components, and to manage this communication, plus for the management and control of parameters of the transforms associated with the output ports. In one embodiment, these exterior methods are implemented as methods of interface classes in IDL, the interface definition language for CORBA. The interface includes methods to get the port name get_portName( ), get the emitted data type, get_dataType( ), and get the list of inputPorts connected to the output port, getinputConnections. The parameters of the output port are obtained from outside the component using the getParameters( ) method. The definitions of the parameters of the output port are obtained from outside the component using the getParameterDefs( ) method. Outside applications or the Framework Manager change values of these parameters using the setParameters( ) method. The method connectInput( ) is the mechanism the Framework Manager uses to establish the connections from the output port to the input port of the other component. The disconnectInput( ) method removes the connection established by the connectInput( ) method.

Parameters

The parameters are now described. Parameters are self describing entities that control the behavior a component or of a transform associated with an output port. Parameters are consistent over the life of the component that is, they exist in the beginning of the component until the component destructor is called. Parameters always have the default values, and the values of parameters can be modified after they are set. Again, parameters are externally observable, that is, observable by the Framework Manager and outside applications, as well as being observable internally to the component.

The parameters are managed by the ParametersSet class, which is a container class, which can store individual parameters as parameter records. The ParameterRcd objects are stored in the parameterSet. Each ParameterRcd describes the single parameter that controls the signal processing behavior of the transform or of the component. This behavior is controlled at runtime. By using this parameter interface, there is a common mechanism for all components in order to modify the behavior of the component regardless of the detailed parameters. The ParameterSet class is not extended but is used unchanged. It is used in its entirety to provide all its capabilities simply by changing the values at runtime. Each individual ParameterRcd object can store one of three types of data, integer, double or a string. Each ParameterRcd object has the following five entities: the current value, the default value that exists when the component is first constructed, the minimum acceptable value, the maximum acceptable value, and a list of acceptable values where acceptable values can be enumerated, instead of being controlled by a minimum and maximum. If an attempt is made to set the value of a parameter outside of these minimum and maximum limits, an exception automatically occurs and the value is not set within the component.

The following methods are provided to control objects of class ParameterSet, which is the container of multiple parameter records. These methods include methods used for accessing the parameters, getIntParameter( ), getStringParameter( ), getDoubleParameter( ), getName( ). The method getIntParameter( ) obtains the value element of a ParameterRcd of a specified name in integer format. The method getStringParameter( ) obtains the value element of a ParameterRcd of a specified name in string format. The method getDoubleParameter( ) obtains the value element of a ParameterRcd of a specified name in double precision floating point format. The method getName( ) returns the name of the ParameterSet established typically by the constructor of the component. There are complementary methods to set the parameters: setName( ) establishes the name of the parameterSet, setParameter( ) establishes the value of the ParameterRcd identified by the name specified. A convenience method is provided for the component or other objects within the component, to fetch parameters modified by the framework or other outside application, fetchModifiedValue( ) and fetchNextModifiedValue( ).

There are methods provided on the ParameterSet used to add, update and delete parameters. These are typically used during the construction or destruction of the component. The addParameter( ) method accepts new parameters by name and default value, and is used by components to create unique parameters for a particular signal processing application. The method addEnumeration( ) accepts enumerated values such as "A", "B", "C", or "D" to be added to a specified parameter. The method removeParameter( ) allows for the parameter to be removed. This is typically used during the destructor. There are methods used to reset parameters to default values, resetAll( ) and reset( ) which take the name of the parameter. This allows the component to return to the default value rather than a currently set value, a value that was set by the Framework Manager. The updateParameterSet( ) method tests each value of each parameter to ensure it is within bounds prior to setting the value of the parameter.

Each ParameterSet is composed of ParameterRcd objects. A ParameterRcd class has a number of methods that are used to manipulate the parameter record itself. The constructor for the ParameterRcd object creates the object. The method getDataType( ) retrieves the data type of a particular ParameterRcd object. Additional methods on the ParameterRcd class include getAcceptableValues( ) which returns a vector of acceptable values set during the construction and creation of the ParameterRcd. The getName( ) methods returns the name of the parameter, getDoubleParameter( ) returns the value of the parameter as a double precision floating point number, getStringParameter( ) returns the value of the parameter as a character string, and getIntParameter( ) returns the value of the parameter as an integer. The method getDefaultValue( ) returns the default value of the particular parameter record. The method SetParameters( ) attempts to set the value of the parameter, first checking the minimum and maximum acceptable values, or the permitted enumerated values. The methods getMaxValue( ) and getMinValue( ) returns the maximum and minimum acceptable values of the parameter, which was set when the ParameterRcd was constructed. The method getValue( ) gets the actual and current value of that ParameterRcd.

The component interfaces with the framework to set and get the parameters of components or output ports. In one embodiment, these exterior methods are implemented as methods of interface classes in IDL, the interface definition language for CORBA. These exterior interfaces for the parameters interface to the framework is through the component base class. The parameters that control the behavior of the component are available to the framework and outside applications via the getParameter( ) method, and are settable via the setParameter( ) method. The definitions of the parameters are available via the getParameterDefs( ) method. Upon a setParameter( ) invocation, the parameter is checked and the updateParameters( ) method of the extended component base class is invoked. In the present example that method is the updateParameters( ) method of TmpCntl. The component updates any attributes and performs any changes in behavior as the parameters dictate.

Transform

What is now described is the transform base class. The transform base class is extended by the component developer. The transform is one instance of the signal processing performed by the component. The transform class is where the signal processing work gets done inside the component. In the present example, each object that will perform the signal processing is of class TmpTransform, which inherits from TransformBaseClass. This encapsulates the signal processing involved inside the component. At least one of the transform base class methods acceptDataPacket( ) and acceptEventPacket( ), must be overloaded by the component developer, as is done in the present example TmpTransform class, having the acceptDataPacket( ) method which is where the signal processing code goes. When data arrives at the component, it arrives in the input port, on the framework side of the interface, invoking acceptFloatPacket( ), for example if the data type is floating point data representing signal samples. The component extended inport, in the example TmpDataInput, calls the acceptFloatPacket( ) method. This method typically calls the acceptDataPacket( ) of the extended transform object, in the example TmpTransform. The acceptDataPacket( ) of the extended transform object performs the signal processing work. When the signal processing work is completed for that packet, the transform object invokes the send( ) method on the output port. The transform base class has minimal functionality, but is extended and is where the signal processing work is inserted by the component developer. All the other required interfaces and infrastructure support are provided by the extended inPort class which, again, is providing input data in proper format as it arrives.

Plots

With respect to the Component plot interface, it should be first mentioned that traditional software development tools do not provide useful representation of vectors or arrays of sampled data such that a signal processing engineer can quickly visualize the internal functioning, or perhaps more correctly, the malfunctioning of the component software during development. The plot class is an interface is to permit the visualization of the data in a graphical format. Specifically for signal processing, this is the software analog of an oscilloscope probe.

The plot capability includes the ComponentsPlot set class and a ComponentPlot. The ComponentPlotSet is a container class of ComponentsPlots which will be described first. The Component base class has one ComponentPlotSet. The ComponentPlot provides updated graphical plot of data within the component used for signal processing debugging and diagnostics. These plots can be viewed with an external application. The ComponentPlot class is extended to create a plot class specifically for that component. In the example it is class TmpPlot. Each extended ComponentPlot has a parameter set to define and control the behavior of the plot itself. This interface is similar to the parameter set of the component, and in fact, uses the same class parameterSet. The extended ComponentPlot has a method for getting the plot name: getPlotName( ). The extended ComponentPlot class also has methods to manage the plots updates: selectPlot( ) which is called when the external plotting application requests the plot, and refreshPlot( ) which is called internally by the component and provides the rendering of the plot. The selectPlot( ) and refreshPlot( ) methods are completed by the component developer to render and populate the plot using plot tool interface methods, which will be described later. The ComponentPlot base class has a method to obtain the parameters of the plot: getParameters( ), and a method to obtain the plot tool interface that is the reference of the external application via getPlotTool. The ComponentPlot base class method refreshRequired( ) which tests whether a timer has expired and whether it is time to render the plot and the method setRefreshInterval( ) which establishes how often the plot should be plotted.

The ComponentPlotSet class is the container of ComponentPlot objects. The methods on the ComponentPlotSet provide access methods by name: getPlot( ), getParameters( ), refreshRequired( ), refreshPlot( ) and selectPlot( ) and cancelPlot( ) for an entire container of plots. These are similar in functionality to the similarly named methods on the individual ComponentPlot class. The ComponentPlotSet class also has methods for adding a ComponentPlot object once created: AddCPlot( ), and for removing a ComponentPlot object: RemoveCPlot( ).

The component plot interface also interfaces to an external graphics plotting application for the framework. This interface is typically used by the selectPlot( ) and refreshPlot( ) methods on the extended ComponentPlot object, in the present example, an object of class TmpPlot, to render plots on the external graphics plotting application upon request of the external application. From within the component, this interface is constant. This interface has a method to add and initialize a plot and a method to remove a plot: addPlot( ) and removePlot( ). A method setPlotTool( ) is provided to specify which instance of an external graphical plotting application is to be used, given a handle, the format of which is a function of the underlying communications mechanism used in the embodiment of the framework. A method is provided to add and initialize a text panel on the external plotting application, addTextPanel( ), to clear text from the rendered panel, clearText( ), and a method to write text to the panel, writeText( ). Methods are provided to plot a vector of signal data as a function of index, plotfx( ), and to plot a pair of vectors of signal data, one vector being the abscissa, and one being the ordinate of the point to be rendered, plotxy( ). As described, the external graphics plotting application interfaces with components to receive commands to render plot information graphically. In the preferred embodiment, these commands are implemented as methods of interface classes in IDL. These methods have the same nomenclature and arguments as the methods just described.

The component interfaces with the framework to manage the plotting functionality. In one embodiment, these exterior methods are implemented as methods of interface classes in IDL. These exterior interfaces for the plots interface to the framework is through the component base class. The plot interface on the exterior of the component consists of a method which an external graphics plotting application can invoke to query each component for all the possible plots that it can provide, getAvailablePlots( ). An external graphics plotting application can also query the component for the parameters that may control the plots, parametersForPlot( ). When an external graphics plotting application needs to commence rendering the plot, it invokes the selectPlot( ) method on the exterior interface, which invokes the selectPlot( ) and refreshPlot( ) methods on the extended ComponentPlot object, in the example, an object of class TmpPlot. These methods use the rendering methods described above, such as plot( ), to render plots on the external graphics plotting application. When an external graphics plotting application no longer requires the rendering of signal data, it may invoke the cancelPlot( ) method which indicates to stop rendering the particular plot.

Framework Manager

Having described the base classes and their application to an example component, attention is now turned to the Framework Manager.

It will be appreciated that the entire functionality of the Framework Manager is captured by the interface, which will be described.

The Framework Manager is the root object for the system. It is a singleton in that there is one and only one in each system using this component and framework architecture. The responsibility of the Framework Manager is to keep track of all processors and components. It allows an outside application or applications to identify and locate the processors and components executing on those processors. The Framework Manager's principal role is to manage and deploy the Plan, the Plan being the location of the components on the computers, component interconnection, and the parameters that control component behavior. These three things, in combination, define the system itself, including its operation and its ultimate function as a signal processor.

Framework Manager has a method for the Processor Manager to register, registerProcessor( ), used when the each Processor Manager starts operating, used to indicate to the Framework Manager that processor is available for use in the system. A method is provided for any outside application program to get the list of Processor Managers currently registered, getProcessors( ). The Framework Manager has a methods to obtain a list of which components are currently executing on each processor, getProcessorDetails( ). A similar method is available that identifies the processor executing a particular instance of a component, getProcessorForComponent( ).

A number of methods of the Framework Manager provide control and status information relative to the component itself: a method to register a component which a Processors Manager invokes when the component has been loaded and is ready to run, registerComponent( ); and similarly unregisterComponent( ) which is called by the Processor Manager when the component has shut down; and a method to get the list of components matching certain text strings called getComponents( ). Likewise, a similar method findComponent( ) returns a list of components matching certain names and parameter name, value pairs.

There are a number of methods the Framework Manager provides that are used for the deployment of components. They are used by an outside application in preparation of a Plan. The first is allocateComponenID( ) which ensures a unique component identity on the existing system. The enterPlan( ) method accepts a Plan as a formatted data structure to be entered and deployed, and connections established and parameters set on the particular components identified in the Plan. A similar method enterPlanAsText( ) is also available that accepts the Plan in a human understandable text format. Similarly, enterPlanAsFile( ) allows a file name to be specified and the Plan read from the specified file. Once entered into the Framework Manager, the Plan may be started. A method called startPlan( ) starts all the components in a Plan with the specified name. A method stopPlan( ) stops all the components in a Plan with the specified name. The method removePlan( ) shuts down, invokes the shutdown( ) method on each component, and unloads all the components, given the specified Plan name. The method listPlan( ) provides a list of all Plans that have been deployed or entered into the Framework Manager. The placeComponentMethod( ), which allows an individual component to be placed in addition to that of the Plan. The removeComponentMethod( ) which removes an individual component. The makeConnection( ) method which connects between the output port of one component and the input port of another component. This can be done individually in addition to those identified in a Plan. Likewise, removeConnection( ) method removes an individual connection.

It will be appreciated that each of these methods will be used to provide various configuration and reconfiguration at runtime of the system. In addition, the Framework Manager has an extensible interface to a configuration manager object, not included in this system, which allows an external algorithm to be used for automated deployment, and connections of components, in some optimized manner.

In summary, the Framework Manager allows one to configure and reconfigure the entire signal processing system to be able to add and subtract functionality and reconfigure the entire system on the fly, thus to be able to provide differing signal processing functions within the same equipment suite.

In the configuration process the Plan is read by the Framework Manager in one of its many forms as described above. The components are activated on each of the processors specified each of the components are constructed and are then connected with their initial parameter setting are set. When all that is completed, then each of the components have their start( ) method invoked, which then starts the processing and emitting of data out of the component.

To reconfigure, in the simplest example, a pair of components is disconnected by the Framework Manager, the first component is shut down, another third component deployed, and this third component is connected by connecting the output port of this third component to the input port of the second component. The third component is started and the system now operates performing a different functionality on the same equipment.

Processor Manager

As another integral component to the signal processing system as described above, what is now described is the Processor Manager.

The Processor Manager program resides on each processor within the system. The Processor Manager program is automatically started on each processor when the processor boots up. The Processor Manager is an extension of the Framework Manager projected onto each processor. The Processor Manager loads and starts components at the direction of the Framework Manager, and reports the current processor status and utilization to the Framework Manager. The Processor Manager methods include the method ping( ), which by invoking, the Framework Manager can determined whether the Processor Manager is currently operating; and the registerComponent( ) method in which a component executing on the processor invokes upon its construction to inform the Processor Manager that the component is ready to process. The enableMessageLogging( ) and the disableMessageLogging( ) methods are used by the Framework Manager to tell the Processor Manager to forward any error messages created in the components using the Component base class method sendMessage( ) from the component to the Processor Manager, to the Framework Manager, and which then may be passed to an external application to display the error messages. The listLoadedComponents( ) method provides a list of components currently loaded on the processor. The loadComponent( ) method is used by the Framework Manager to request a particular component be loaded on the processor managed by the Processor Manager. This is typically used during the initial deployment and configuration by the Framework Manager. The removeComponent( ) method is used by the Framework Manager to shutdown and unload the component from the processor managed by the Processor Manager. In addition, the Processor Manager provides usage metrics, which may be used for optimization or analysis of component deployment: the fetchMetrics method which returns data about the processor utilization and memory utilization.

While the subject system has been described in terms of components, base classes, a Framework Manager, and a Processor Manager, when it runs a particular signal processing task, it may involve the communication with outside application programs. Note that the outside application programs can also be used for diagnosing the system. Outside application programs are illustrated at 50 in FIG. 2 which function as follows:

The outside application program interfaces to the parameter set, parameter record and the interface of the components changing individual parameters, which change the behavior of the components at runtime. Additionally, the outside application program can contain a plotting application used by the component plot class. This is referred to as the plot object.

The outside application can also change parameters of the components. The outside application can graphically render the plot output as provided by the components and the component plots interface 40. By changing the parameters on the component or the parameters of the output port, the behavior of the transform and component can be changed at runtime and the effect of those changes can be observed on those component plots which are returned to the outside application program.

Layered Architecture

Figure 6:
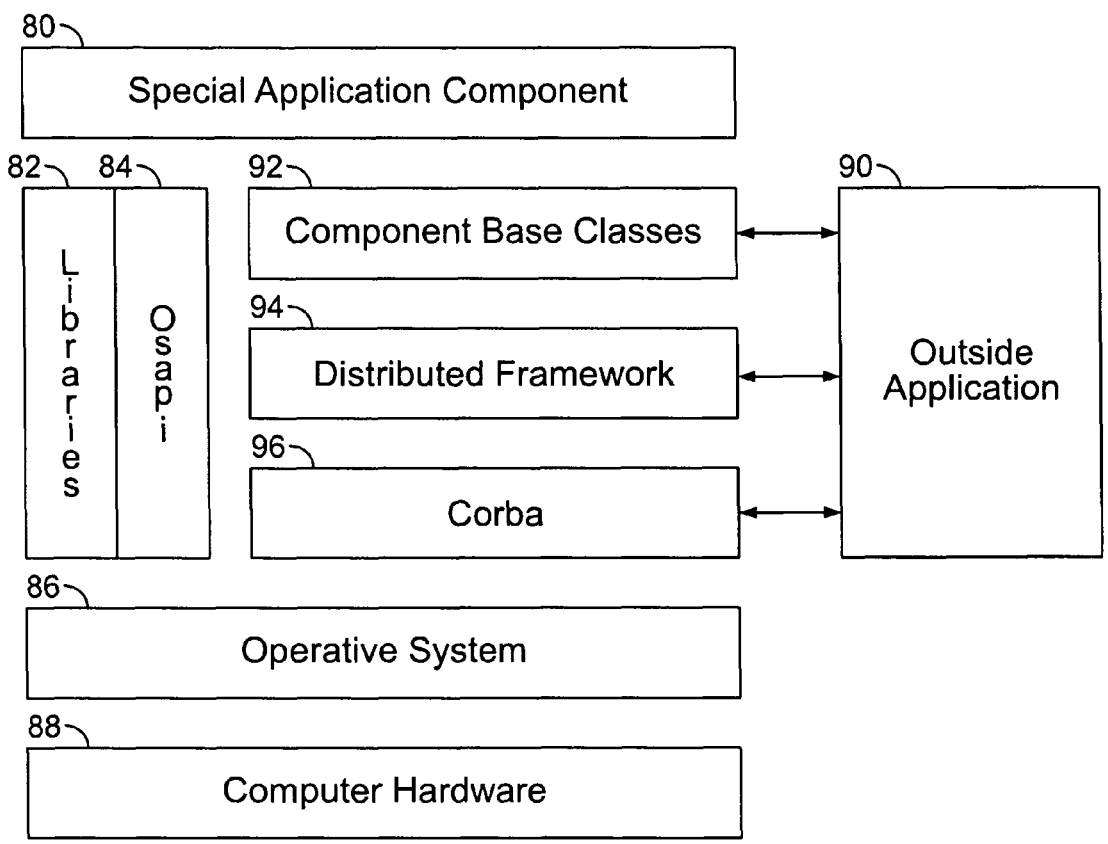

Referring now to FIG. 6, the layered architecture for the present invention is shown. By a layered architecture is meant that objects or modules of the system software are organized into sets referred to as layers. When a module is part of one layer it can use any other module in that layer directly. However, when a module in one layer must use the capabilities in another layer it can only do so according to the strict interface definition at the layer-to-layer boundary. Layers are used to reduce complexity by restricting relationships between modules thereby providing independence between different parts of the system. The goal is to increase reusability and maintainability in software systems. For example, by layering the operating system interface, one ensures that a change in operating system does not affect the entire software system.

As illustrated in FIG. 6, particular computer hardware 88 actually executes the computer code to run the signal processing application. Higher level software does not interact directly with the computer hardware, instead it interfaces through the specific Operating System 86. Example operating systems which have been used for implementing this system include Microsoft Windows NT, VxWorks, and LINUX. Since these various operating systems and others all have somewhat different interfaces, the translation is isolated within the Operating System Application-Programming Interface, or OSAPI, layer 84 composed of the OSAPI class.

The OSAPI provides platform-independent and operating-system-independent methods to access the underlying operating system capabilities. Thus the OSAPI layer is a translation from the native operating system to a common interface used by the components regardless of the native operating system or native hardware platform.

These include but are not limited to methods to change specific directory or path, chdir( ) or fixPath( ); methods to start a task or perform a system call, spawn( ) and system( ); methods for environment initialization or host management, startup( ), getHostName( ), hostType( ); and methods for swapping bytes and determining the so-called Endian type of the platform, such as littleEndian( ), swap2ByteData( ), swap4ByteData( ), swap8ByteData( ) which provide platform independent operation. Methods to handle time functions using seconds or microseconds such as getHighResTime( ), geTimeofDay( ), timeToText( ), sleep( ), usleep( ) may be used; and other methods to control processing include, taskLock( ), taskUnlock( ), contextSwitch( ) and to move data, fastestCopy( ). These are all independent of the underlying actual operating system and allow the same source code to be used in multiple processor environments and operating system environments. Endian describes the ordering used natively by the machine in a multi-byte word. For example, a four byte integer in little endian representation has the least significant byte placed first in memory and the most significant byte placed fourth in memory. In big endian representation, the first byte in memory is the most significant byte; the third byte or the fourth byte in memory is the least significant byte. This endian conversion, byte swapping and endian test permits interoperation between different types of computer hardware.

A Libraries layer 82 provides a standard set of calls for signal processing primitives such as Fast Fourier Transform FFT( ) and Finite Impulse Response Filter FIR( ). The interfaces to these libraries is constant regardless of the actual computer type being used to perform the computations. In one embodiment the interface to the components is provided by the industry-standard Vector Signal and Image Processing Library (VSIPL). Most hardware vendors provide VSIPL libraries that are optimized for their hardware platform.

The CORBA layer 96 provides default method for remote object method invocation in one embodiment. CORBA stands for the industry standard Common Object Request Broker Architecture and it is implemented by an off-the-shelf product. This selection is in keeping with the underlying object-oriented architecture of the system, but can be changed and so has been isolated in its own layer. Other communication means include sockets, which are supported by the target operating systems, and the native communications protocols of the switched fabric interconnects are also available within the distributed framework.

A Distributed Framework layer 94 consists of the Framework Manager, Processor Managers and other objects and services which provide the infrastructure for operating the components in a system.

The Component Base Classes layer 92 provides most of the generic capabilities needed by all components in the system. These base classes are described in detail above. This layer facilitates rapid development of components from direct reuse of much common software code. By providing the interface between the Specific Application Components 80 and the interface from the Components 80 and the Distributed Framework 94, it relieves the software component developer from the burden of complying with these interfaces.

Specific interfaces are also defined between the Component Base Classes, the Distributed Framework, CORBA, and the Outside Applications 90 which control the system and receive the processing results. Examples include the plot interfaces, parameters interface, and statistics interface from the component base classes, and the Framework Manager and processor manager interfaces as described above.

A program listing for the illustrated embodiment is provided in the Appendix hereto.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A local distributed processor device reconfigurable for performing a plurality of functions, the local distributed processor device comprising:
    a local data communication fabric;
    a plurality of processor devices interconnected for communication through the local data communication fabric, each of the plurality of processor devices having an associated processor manager configured to control software components associated with an individual processor device of the plurality of processor devices;
    a port configured to receive data from one or more outside application programs; and
    a framework manager connected to the local data communication fabric and to the port, the framework manager being configured to:
        interact with the associated processor managers to control the plurality of processor devices via the local data communication fabric,
        monitor the port for requests from one of the one or more outside application programs,
        receive requests from the one of the one or more outside application programs for the local distributed processor device to perform one or more of the plurality of functions including a request to load a plan, the plan including a predefined configuration of a plurality of software components used to provide the one or more of the plurality of functions using the local distributed processor device with which individual software components are associated, and how the individual software components and the plurality of processor devices are interconnected,
        load the plan from a library,
        assign one or more of the plurality of software components to particular ones of the plurality of processor devices according to the plan, wherein assigning one or more of the plurality of software components includes passing information identifying at least one software component to the associated processor managers for the plurality of processor devices such that the associated processor managers can download the at least one software components to the individual processor devices, and
        initialize the local distributed processor device based on the plan and properties of the plurality of software components to carry out the one or more of the plurality of functions requested by the one outside application program.

2. The local distributed processor device of claim 1 wherein the framework manager and the processor managers are configured to operate on a distributed framework layer.

3. The local distributed processor device of claim 2 wherein the plurality of processor devices are adapted to operate on a computer hardware layer that is separated from the distributed framework layer by an operating system layer.

4. The local distributed processor device of claim 3 wherein the framework manager and the processor managers of the distributed framework layer interact with the plurality of processor devices of the computer hardware layer via an operating system application programming interface layer.

5. The local distributed processor device of claim 1 wherein the plurality of software components are adapted to operate on an application component layer;
 wherein the software components are configured to inherit characteristics from component base classes that define an operational capability of the software components; and
 wherein the component base classes are adapted to reside on a component base classes layer that is further configured to interact with the applications component layer according to an interface definition at a boundary between the layers.

6. The local distributed processor device of claim 1 wherein the framework manager is configured to receive at least one other plan corresponding to at least one other function.

7. The local distributed processor device of claim 6 further comprising at least one other software component programmable to provide the at least one other function; and
 wherein the framework manager is configured to initialize the local distributed processor device based on the at least one other plan and properties of the at least one other software component such that the local distributed processor device is configured to carry out a plurality of functions.

8. The local distributed processor device of claim 6 wherein plans share at least one common software component.

9. The local distributed processor device of claim 1 wherein the plurality of software components are configured to have a standardized interface, such that functionality can be added through addition of software components without regard to a platform on which the software components are to be run.

10. The local distributed processor device of claim 1 wherein the framework manager is configured to receive a plan that includes: a list of the plurality of software components, the processor device with which the individual software components are associated, and how the software component and the processor device are interconnected.

11. The local distributed processor device of claim 1 wherein the framework manager is configured to assign one or more of the plurality of software components to particular ones of the plurality of processor devices by passing names of the components to the processor managers of the particular ones of the plurality of processor devices.

12. The local distributed processor device of claim 1 wherein the software components, when programmed, provide a function comprising at least one of:
 a signal intelligence system having a receiver interface;
 a signal energy detection system;
 a system for signal recognition;
 a direction finding system; or
 a countermeasure system.

13. A method of operating a framework manager of a local distributed processor device environment including a plurality of interconnected processor devices, each having an associated processor manager to control a plurality of software components and communicating with a local communication fabric, the framework manager connected to the local communication fabric to interact with processor managers, the framework manager configured to:
 receive signals from the processor managers associated with respective computers of the local distributed processor device, the signals indicating that the computers are ready to accept at least one software component;
 monitor a port of the local distributed processor device for requests from one or more outside application programs;
 receive a request from at least one of the one or more outside application programs for the local distributed processor device to perform one or more of a plurality of functions, the request including a request to load a plan;
 load the plan from a library requested by the one of the one or more outside application programs, the plan defining a plurality of software components, a configuration of the plurality of software components which provides the one or more of the plurality of functions using the local distributed processor device with which a software component is associated, and how the plurality of software components and the processor device are interconnected;
 assign one or more of the plurality of software components to particular ones of the computers according to the plan, wherein assigning the one or more of the plurality of software components includes passing information identifying the at least one software component to the associated processor managers for the computers such that the associated processor managers can download the one or more of the plurality of software components to the individual computers;
 receive signals from the processor managers, the signals indicating that the one or more of the plurality of software components have been loaded onto the associated computers;
 analyze the plan to identify the interconnections between the plurality of software components;
 establish connections between the plurality of software components on a data communication fabric according to the interconnections of the plan;
 cause individual ones of the plurality of software components to start, such that the plurality of software components operate to cause the local distributed processing device to provide the one or more of the plurality of functions specified by the plan.

14. The method of claim 13 wherein the assigning one or more of the plurality of software components to the computers comprises passing a name of the at least one software component to the associated processor managers for the computers.

15. The method of claim 13 further comprising setting initial parameter values of the plurality of software components according to initial parameters defined in the plan.

16. The method of claim 13 further comprising developing a list of the processor managers and associated computers that are ready to accept the at least one software component.

17. The method of claim 16 further comprising:
 recording the plurality of software components and the associated computers in the list;
 receiving notification when at least one software component fails; and
 removing the at least one software component that failed from the list.

18. An article of manufacture including a computer-readable medium having instructions stored thereon that cause a computing device to perform operations of a framework manager of a local distributed processor device environment including a plurality of interconnected processor devices, each having an associated processor manager to control a plurality of software components and communicating with a local communication fabric, the framework manager connected to the local communication fabric to interact with the local processor managers, the framework manager configured to:

receive signals from a plurality of processor managers associated with respective computers of a local distributed processor device, the signals indicating that the computers are ready to accept at least one software component;

monitor a port of the local distributed processor device for requests from one or more outside application programs;

receive a request from at least one of the one or more outside application programs for the local distributed processor device to perform one or more of a plurality of functions, the request including a request to load a plan;

load the plan from a library requested by the one of the one or more outside application programs, the plan defining a plurality of software components, a configuration of the plurality of software components which provides the one or more of the plurality of functions using the local distributed processor device with which individual software components are associated, and how the plurality of software component and the processor device are interconnected;

assign one or more of the plurality of software components to particular ones of the computers according to the plan, wherein assigning the one or more of the plurality of software components includes passing information identifying at least one of the plurality of software components to the associated processor managers for the computers such that the associated processor managers can download the one or more of the plurality of software components to the individual computers;

receive signals from the processor managers, the signals indicating that the one or more of the plurality of software components have been loaded onto the associated computers;

analyze the plan to identify the interconnections between the plurality of software components; establishing connections between the plurality of software components on a data communication fabric according to the interconnections of the plan;

cause individual ones of the plurality of software components to start, such that the plurality of software components operate to cause the local distributed processing device to provide the one or more of the plurality of functions specified by the plan.

19. The article of manufacture of claim 18 wherein the assigning the plurality of software components to the computers comprises passing a name of the at least one software component to the associated processor managers for the computers.

20. The article of manufacture of claim 18 further including instructions stored thereon that, if executed by the computing device, cause the computing device to set initial parameter values of the plurality of software components according to initial parameters defined in the plan.

21. The article of manufacture of claim 18 further including instructions stored thereon that, if executed by the computing device, cause the computing device to develop a list of the processor managers and associated computers that are ready to accept the at least one software component.

22. The article of manufacture of claim 21 further including instructions stored thereon that, if executed by the computing device, cause the computing device to:

record the plurality of software components and the associated computers in the list;

receive notification when at least one software component fails; and remove the at least one software component that failed from the list.

* * * * *

UNITED STATES PATENT AND TRADEMARK OFFICE
CERTIFICATE OF CORRECTION

PATENT NO. : 8,095,927 B2
APPLICATION NO. : 12/386136
DATED : January 10, 2012
INVENTOR(S) : Boland et al.

It is certified that error appears in the above-identified patent and that said Letters Patent is hereby corrected as shown below:

Page 2, item (56), under "Other Publications", in Column 2, Line 35, delete "2007 2007 and" and insert -- 2007 and --.

Page 2, item (56), under "Other Publications", in Column 2, Line 60, delete "Environment'," and insert -- Environment, --.

Column 22, Line 58, in Claim 1, delete "at least one software components" and insert -- at least one software component --.

Column 25, Lines 27-28, in Claim 18, delete "plurality of software component" and insert -- plurality of software components --.

Signed and Sealed this
Nineteenth Day of June, 2012

David J. Kappos
*Director of the United States Patent and Trademark Office*